United States Patent

Goldberg et al.

[11] Patent Number: 5,681,466
[45] Date of Patent: Oct. 28, 1997

[54] FILTERING APPLIANCE FOR CLEANING COOKING OIL

[75] Inventors: Margaret Buchart Goldberg, Dalcairn, Grange of Elcho, Rhynd, Perth PH2 8QJ; Terence Murray Goldberg, Perth; Michael Phillip Griese, Angus, all of Scotland

[73] Assignee: Margaret Buchart Goldberg, United Kingdom

[21] Appl. No.: 716,423

[22] PCT Filed: Mar. 21, 1995

[86] PCT No.: PCT/GB95/00623

§ 371 Date: Sep. 20, 1996

§ 102(e) Date: Sep. 20, 1996

[87] PCT Pub. No.: WO95/25575

PCT Pub. Date: Sep. 28, 1995

[30] Foreign Application Priority Data

Mar. 22, 1994 [GB] United Kingdom ............... 9405617

[51] Int. Cl.[6] ............................................. B01D 29/58
[52] U.S. Cl. ................... 210/350; 210/356; 210/416.1; 210/453; 210/488
[58] Field of Search .................... 210/167, 350, 210/351, 352, 416.1, 356, 488, 441, 453, 454

[56] References Cited

U.S. PATENT DOCUMENTS

| 2,753,047 | 7/1956 | Kettlewell. | |
| 3,622,003 | 11/1971 | Czech | 210/356 |
| 4,350,590 | 9/1982 | Robinson | 210/352 |
| 4,632,755 | 12/1986 | DeGraffenreid. | |
| 4,664,814 | 5/1987 | Backman et al. | 210/356 |

FOREIGN PATENT DOCUMENTS

| 241617 | 10/1987 | European Pat. Off. . |
| 381355 | 8/1990 | European Pat. Off. . |
| 498207 | 8/1992 | European Pat. Off. . |

Primary Examiner—W. L. Walker
Attorney, Agent, or Firm—Gifford, Krass, Groh, Sprinkle, Patmore, Anderson & Citkowski, P.C.

[57] ABSTRACT

A filtering appliance for cleaning cooking oil in a food fryer is designed and dimensioned for single-handed portable use in "hand-gun" fashion. The appliance has an elongate casing means with a hand grip at one end adjacent a pump-and-motor assembly. An intake nozzle conducts oil to be cleaned to a cartridge style filter made by stacking annular elements cut from a commercially available filter material of fibrous mat forming matrix holding particulate filtering media. The filter is axially spring loaded to accommodate yielding of the filter material. The appliance discharges into the food fryer through a duct outside the casing means. Thus, the oil is recirculated to achieve cleaning.

6 Claims, 2 Drawing Sheets

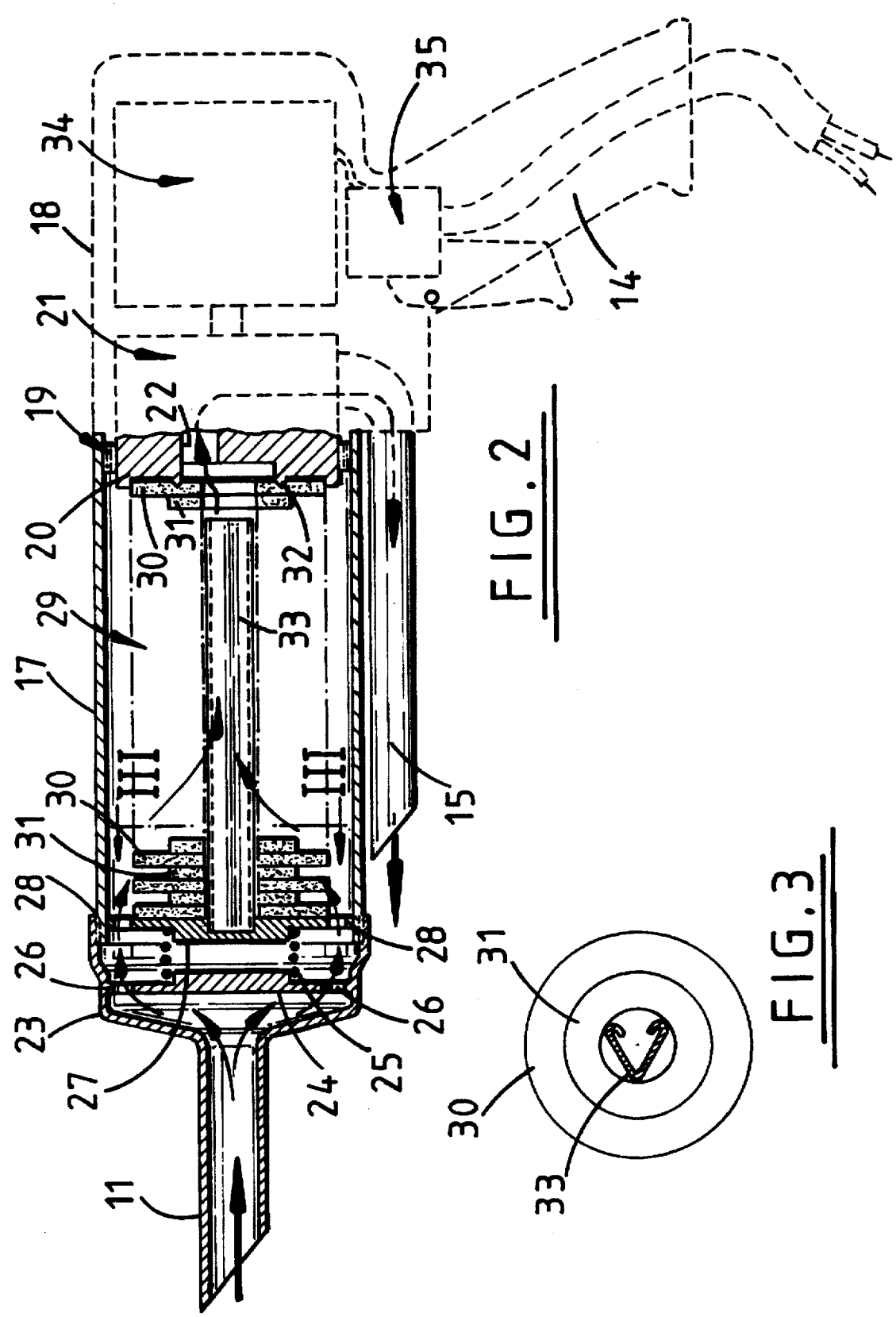

FILTERING APPLIANCE FOR CLEANING COOKING OIL

This invention relates to a filtering appliance for use in removing debris and/or other matter from cooking oil in a food fryer.

The invention is especially, but not exclusively, concerned with a filtering appliance as aforesaid and which possesses, in combination, the features of single-handed portability and motorised operation. These features make it feasible conveniently to clean or partially clean the oil in a food fryer several times during a single day without disrupting the use of the fryer to an unacceptable extent.

We have found that, having regard to dimensional limitations imposed by the aforesaid single-handed portability, it is desirable to circulate oil through the filtering appliance at as high a rate, in terms of cubic measure per unit time, as possible and at the same time achieve a filtering performance, in terms of oil cleaning, consistent with certain regulations in the food industry. These requirements dictate that the filtering appliance comprises a cartridge type filter of generally elongate configuration and annular cross-section. Such filters are described, for example, in United States Patent Specifications Nos. 2753047 (Kettlewell) and 4632755 (Graffenried) both of which are concerned specifically with filters constructed from stacked annular filter elements. In each case, the filter stack is clamped between abutments which are fixed within a casing of the filter appliance when the appliance is assembled. These arrangements have the disadvantage that they are unsuited for use with a filter stack which is not dimensionally stable in the axial direction.

According to the present invention there is provided a filtering appliance comprising an elongate casing defining inwardly facing surface, a stack of annular filter elements disposed within the casing and defining outwardly facing surface and a hollow core, the annular filter elements being of a compressible material so that the length of the stack is variable in use according to the magnitude of force acting on the stack in the longitudinal direction thereof, the inwardly facing surface of the casing being spaced from the outwardly facing surface of the stack, an abutment means within and fixed to the casing and abutted by one end of said stack, means defining a duct in said abutment means for carrying fluid from the hollow core of the stack, fluid outlet means for discharging filtered fluid from the appliance and communicating with said duct, closure means defining mutually opposite faces of which one is in contact with an other end of the stack to prevent fluid flow directly into the said hollow core of the stack, the closure means being shiftable with respect to the casing to enable the closure means to follow the said other end of the stack when in use the length of the stack varies, fluid inlet means providing access to the outwardly facing surface of the stack and to the other face of the closure means, a spring arranged to act between the casing and the said other face of the closure means and urging the closure means to remain in contact with said other end of the stack, and an elongate former extending within the stack and having the annular elements arranged thereon so that the annular elements and the former are mutually relatively shiftable in the longitudinal direction thereof.

An embodiment of the present invention will now be described, by way of example, with reference to the accompanying drawings in which:

FIG. 2 is a partly-sectioned side elevation of the filter appliance shown in FIG. 1 and to a slightly larger scale; and FIG. 3 is a cross-sectional view on the line III—III in FIG. 2.

Figure 1:
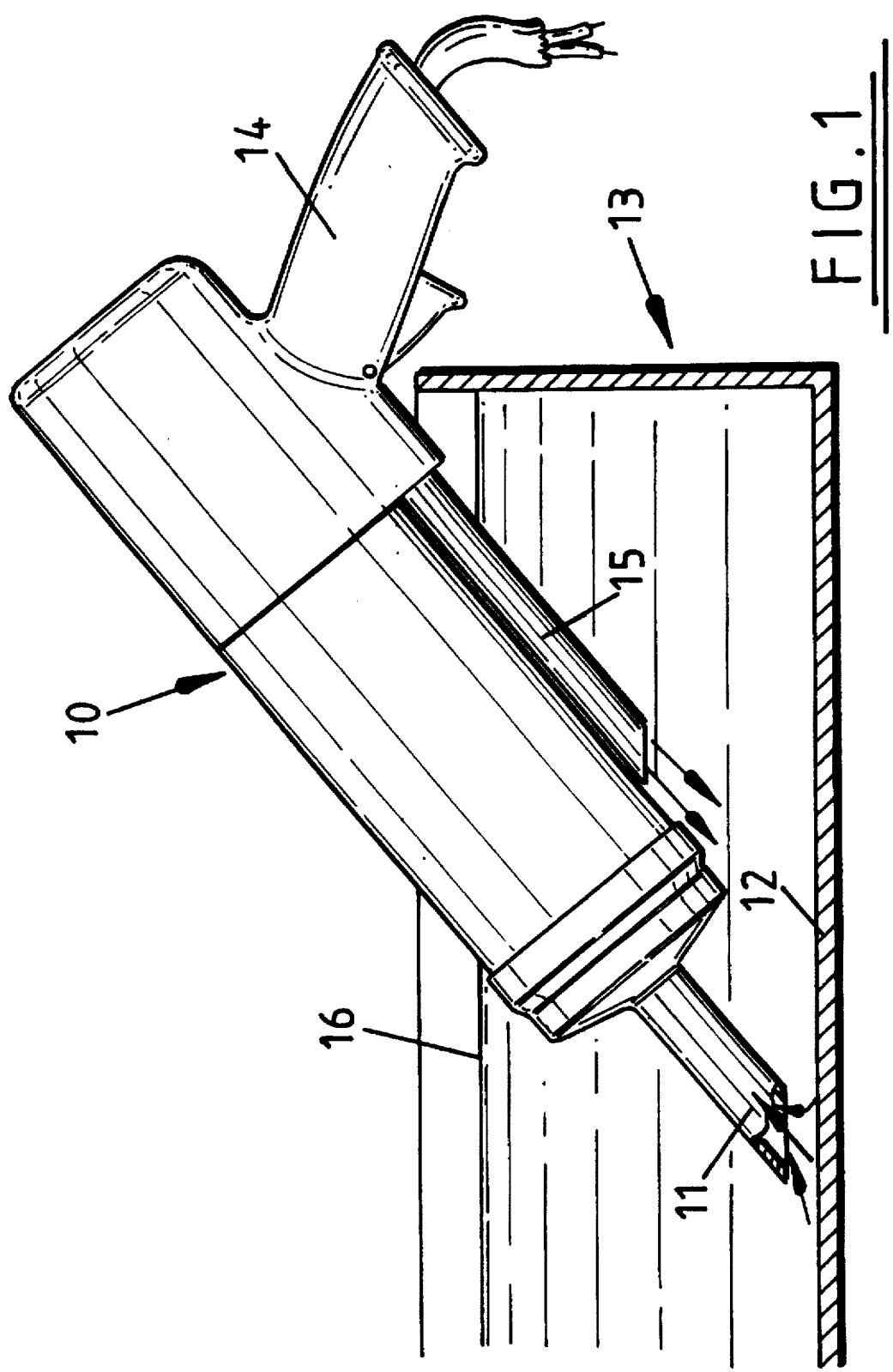
FIG. 1 is partly-sectioned side elevation showing a filter appliance in accordance with the present invention being used to remove debris and/or other matter from cooking oil in a food fryer.

In FIG. 1 of the drawings, the filtering appliance consists of an elongate casing means indicated generally by reference numeral 10 and having an intake nozzle 11 at one end of the casing means 10 for sweeping over the floor 12 of a food fryer part of which is indicated by reference numeral 13. A hand grip 14 is arranged at and secured to the other end of the casing means 10 which, together with the nozzle 11 and the hand grip means 14 is dimensioned consistently with single-handed portable use of the appliance. A discharge duct 15 extends from within the casing means 10 and is arranged to discharge adjacent the outside of the casing means. The food fryer 13 is shown to contain cooking oil 16; and in use of the appliance the nozzle 11 and the adjacent end portion of the casing means 10 is immersed in the oil 16 and the appliance is operated to suck oil in through the nozzle 11 and discharge filtered oil through the discharge duct 15. Intake and discharge of oil is effected by a motor-and-pump means (not shown in FIG. 1) within the casing means 10; and filtering of the oil is effected by a filter (not shown in FIG. 1) also within the casing means 10.

The appliance is designed to intake and discharge oil at a rate of the order of 20 liters per minute. A sweeping motion of the appliance with the nozzle 11 close to the floor 12 effectively picks up particulate material from the floor. Otherwise, even with the appliance held motionless with the nozzle 11 and the discharge duct 15 immersed, a marked improvement in the condition of the cooking oil is achieved within a few minutes for an average size of food fryer.

The construction of the appliance of FIG. 1 is more particularly described as follows with reference to FIGS. 2 and 3 in which parts corresponding with those in FIG. 1 are given the same reference numerals as used in FIG. 1.

The casing means 10 consists of a tubular casing 17 and a motor-and-pump housing 18, the casing 17 being assembled to the housing 18 by means of screw-threaded rings 19 the inner one of which is fixed to the body 20 of a pump 21. The pump body 20 has a pump intake duct 22 and thus serves as an apertured fixed wall adjacent one end of the casing 17. The other end of the casing 17 is provided with a removable closure 23 which merges with the intake nozzle 11. Within the closure 23, there is a partition 24 providing a seat for one end of a compression spring 25 and having a circular array of openings 26 for the passage of oil through the appliance.

The other end of the compression spring 25 seats on one face of a second, shiftable, partition 27 which also is provided with a circular array of openings 28 for the passage of oil through the appliance. The partition 27 serves as a closure plate the opposite face of which abuts and closes one end of a filter which is of generally cylindrical configuration and having a hollow core. The filter consists of a stack 29 of mutually interleaved annular elements 30, 31 in which the elements 30 are of relatively large diameter and the elements 31 are of relatively small diameter. The inwardly facinf surface of the casing 17 is spaced from the outwardly facing surface of the stack 29. All of filter elements 30, 31 are cut from a sheet of filter material consisting of a mat of fibres bonded together to form a matrix with particulate filtering medium or media held within the matrix. Such a filter material is typically manufactured as filter pads and is available from Filtercorp Europe of Guildford, Surrey, GU4 7YX under the trade name SuperSorb. This filter material is particularly suited to the cleaning of cooking oil but is not available in "cartridge" configuration. Thus, the "cartridge" (or generally hollow cylindrical) configuration required for the present appliance is constructed from the aforementioned annular elements.

Opposite the closure plate 27, the stack 29 abuts the pump body 20 in engagement with an annular formation 32 which is chamfered to penetrate the abutting annular element 30 to prevent uncleaned cooking oil from by-passing the stack 29. Typically, the larger annular elements 30 have an outer diameter of 64 mm and the smaller annular elements 31 have an outer diameter of 48 mm. All of the annular elements have a core diameter of 26 mm and all of the annular elements are approximately 3.5 mm thick. These dimensions are found to be consistent with providing a relatively large outer surface of the filter in the interests of attaining relatively high filtering efficiency.

The filter material is charcoal impregnated (as manufactured) and is yieldable under compression. Thus, the stack of annular elements is not rigid in the axial direction. To deal with this, the compression spring 25 maintains an axial pressure on the stack 29 and the stack of annular elements is stabilised by an elongate former 33 the forward end of which is attached to the closure plate 27. The former 33 is of hollow cross-section with a triangular configuration as can be seen in FIG. 3 designed to permit free flow of filtered oil axially through the core of the stack 29 towards the pump intake duct 22. The axial length of the former 33 is less than the expected fully compressed length of the stack 29 so that the stack is always free to vary in length axially without the rear end face of the former 33 abutting the pump body 20. It will thus be understood that the annular elements 30, 31 and the former 33 are mutually relatively shiftable in the axial direction. It will be appreciated that, in use, a pressure differential will exist between the outside and the inside of the stack 29 so that a pressure of oil acting on the free face of the closure plate 27 will tend to compress the stack 29. The pressure differential will increase and tend further to reduce the axial length of the stack as the material becomes loaded with cleanings.

The pump 21 discharges into the discharge duct 15 and is driven by an electric motor 34 designed for relatively low voltage operation and supplied from a re-chargeable battery pack (not shown). The electric motor 34 is connected with a sensing/switching device 35 adapted to switch the motor off upon sensing a motor current in excess of a predetermined value. This arrangement thus monitors the condition of the filter material of stack 29 by relating the motor current to the condition of the filter material on the basis that progressive loading of the filter material with cleanings from the oil being cleaned will cause an increase of loading of the motor and a consequent increase in motor current.

The filter construction described above makes available the benefit of a "cartridge" type of filter construction using a filter material which does not lend itself to production in "cartridge" form. A mat of fibres bonded together to form a matrix with particulate filtering medium or media (eg. activated charcoal, silicate etc.) is produced in sheet form from a slurry.

We claim:

1. A filtering appliance comprising an elongate casing (17) defining an inwardly facing surface, a stack (29) of annular filter elements (30, 31) disposed within the casing (17) and defining an outwardly facing surface and a hollow core, the annular filter elements (30, 31) being of a compressible material so that the stack (29) has a length that is variable in use according to the magnitude of force acting on the stack in a longitudinal direction thereof, the inwardly facing surface of the casing being spaced from the outwardly facing surface of the stack, an abutment means (20) disposed within and fixed to the casing and abutted by one end of said stack, means defining a duct (22) disposed in said abutment means (20) for carrying fluid from the hollow core of the stack, fluid outlet means (15) for discharging filtered fluid from the appliance and communicating with said duct (22), closure means (27) defining mutually opposite faces of which one is in contact with an other end of the stack to prevent fluid flow directly into the hollow core of the stack, the closure means (27) being shiftable with respect to the casing (17) to enable the closure means to follow the said other end of the stack as the length of the stack varies in use, fluid inlet means (11, 23) providing access to the outwardly facing surface of the stack and to an other face of the closure means, a spring (25) arranged to act between the casing and the other face of the closure means and urging the closure means (27) to remain in contact with other end of the stack, and an elongate former (33) extending within the stack (29) and having the annular elements (30, 31) arranged thereon so that the annular elements (30, 31) and the former (33) are mutually relatively shiftable in the longitudinal direction thereof.

2. A filtering appliance according to claim 1, including pump means (21) associated with the casing (17) and operable to induce flow of fluid through said inlet means (11, 23) said filter (29) and said duct (22).

3. A filtering appliance according to claim 2, wherein the pump means (21) is disposed adjacent the abutment means (20) for drawing fluid through said duct (22).

4. A filtering appliance according to claim 3, including an electric motor (34) coupled to the pump means (35) for driving same.

5. A filtering appliance according to claim 4, including electronic sensing and switching means (35) connected to the electric motor (34) and operative to switch the motor off upon sensing a motor current in excess of a predetermined value.

6. A filtering appliance according to claim 1, wherein each annular element (30, 31) is cut from a sheet of filter material comprising a mat of fibres bonded together to form a matrix, and particulate filtering medium held in said matrix.

* * * * *